(12) United States Patent
Hong et al.

(10) Patent No.: US 7,534,293 B2
(45) Date of Patent: May 19, 2009

(54) METHOD AND SOLUTION FOR FORMING ANATASE TITANIUM DIOXIDE, AND TITANIUM DIOXIDE PARTICLES, COLLOIDAL DISPERSION AND FILM

(75) Inventors: Liang Hong, Singapore (SG); Zhaolin Liu, Singapore (SG); Huixin Jiang, Singapore (SG); Bing Guo, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 309 days.

(21) Appl. No.: 11/382,447

(22) Filed: May 9, 2006

(65) Prior Publication Data

US 2006/0254461 A1 Nov. 16, 2006

(30) Foreign Application Priority Data

May 11, 2005 (SG) .............................. 200502952-5

(51) Int. Cl.
*C23C 16/40* (2006.01)
(52) U.S. Cl. ................ 106/287.19; 516/100; 106/287.2
(58) Field of Classification Search ................ 516/100; 106/287.19, 287.2
See application file for complete search history.

(56) References Cited

U.S. PATENT DOCUMENTS

| | | | |
|---|---|---|---|
| 6,576,589 B1 * | 6/2003 | Na et al. ...................... | 502/350 |
| 6,770,216 B2 * | 8/2004 | Takahashi et al. .............. | 252/1 |
| 7,276,567 B2 * | 10/2007 | Voskoboynikov et al. ... | 526/161 |
| 2003/0091500 A1 | 5/2003 | Koinuma et al. | |
| 2003/0091933 A1 * | 5/2003 | Kunita ..................... | 430/283.1 |
| 2003/0215647 A1 | 11/2003 | Yoshida et al. | |
| 2004/0067193 A1 | 4/2004 | Sakatani et al. | |
| 2004/0108302 A1 * | 6/2004 | Liu et al. ...................... | 216/83 |

(Continued)

FOREIGN PATENT DOCUMENTS

CA 2434627 7/2003

(Continued)

OTHER PUBLICATIONS

Chen-Chi Wang and Jackie Y. Ying, Sol-Gel Synthesis and Hydrothermal Processing of Anatase and Rutile Titania Nanocrystals, Chem. Mater. 1999, 11, 3113-3120.*

(Continued)

*Primary Examiner*—Ling-Siu Choi
*Assistant Examiner*—Chun-Cheng Wang
(74) *Attorney, Agent, or Firm*—Barnes & Thornburg LLP

(57) ABSTRACT

A sol solution containing poly(titanic acid) and a planar heterocyclic ligand is provided. Titanium dioxide ($TiO_2$) particles are formed by aging the sol solution at a temperature below about 140° C. The particles have multi-coordinated Ti-complexes comprising the heterocyclic ligand and can be substantially in the anatase phase. The heterocyclic ligands can be triazole, tetrazole, or thiadiazole. The sol solution may be prepared by aging a precursor solution. The precursor solution may contain the heterocyclic ligands and a precursor for poly(titanic acid). The precursor may be titanium alkoxide or titanium chloride. The sol solution may also contain at least one of an organic acid, a base, and a surfactant. The aged sol solution may form a colloidal dispersion of the $TiO_2$ particles. A photo-catalytic and transparent film may be formed from the $TiO_2$ particles by depositing a layer of the colloidal dispersion on a support.

40 Claims, 5 Drawing Sheets

U.S. PATENT DOCUMENTS

2005/0215076 A1* 9/2005 Costa et al. .................. 438/790
2005/0255693 A1* 11/2005 Liu et al. .................... 438/633

FOREIGN PATENT DOCUMENTS

| GB | 878720 | 10/1961 |
|---|---|---|
| WO | WO 03/027187 A1 | 4/2003 |
| WO | WO 2004/028973 A1 | 4/2004 |
| WO | WO 2004/062795 A1 | 7/2004 |
| WO | WO 2004/080918 A1 | 9/2004 |

OTHER PUBLICATIONS

F.L. Duivenvoorde, et al., "Use of Poly (2-Vinylpyridine)-b-Poly (eplison-Caprolactone) Copolymers as Pigment Stabilizers in Powder Coatings", Journal of Coatings Technology; Aug. 2002, pp. 49-57, vol. 74.

Tadao Sugimoto, et al., "Synthesis of uniform anatase TiO2 nanoparticles by gel-sol method 3. Formation process and size control", Journal of Colloid and Interface Science (2003), pp. 43-52, vol. 259.

Zhen Ma, et al., "Nanosized anatase TiO2 as precursor for preparation of sulfated titania catalysts", Journal of Molecular Catalysis A: Chemical (2002), pp. 97-104, vol. 178.

Jin Z. Zhang, "Interfacial Charge Carrier Dynamics of Colloidal Semiconductor Nanoparticles", J. Phys. Chem B, 2000, pp. 7239-7253, vol. 104.

Paul D. Moran, et al., "Formation of TiO2 Sols, Gels and Nanopowders from Hydrolysis of Ti(OiPr)4 in AOT Reverse Micelles", Journal of Sol-Gel Science and Technology, (1999), pp. 251-262, vol. 15.

Lianyong Su, et al., "Spectroelectrochemical study of TiO2 particulate films", Spectrochimica Acta Part A (1997), pp. 1719-1722, vol. 53.

Izutsu Hiroyuki, et al. "Titanium oxide Sol and manufacturing method thereof", Patent Abstracts of Japan, JP 2001-206720, Jul. 31, 2001.

Nishide Riichi, "Anatase-type Titania film, method for producing anatase-type titania Sol and method for producing anatase-type Titania film", Patent Abstracts of Japan, JP2004-091263, Mar. 25, 2004.

Koga Shotaro, "Method of Producing Titanium Oxide film", Patent Abstracts of Japan, JP2001-089142, Apr. 3, 2001.

Kondo Osamu, "Titania Coating liquid and its production method, and Titania film and its formation method", Patent Abstracts of Japan, JP2001-262007, Sep. 26, 2001.

Zhu Yongfa, "Process for preparing mesoporous TiOw powder and film photocatalyst by sol-gel method", English translated Abstract of CN1342517, esp@cenet database, Apr. 3, 2002.

Gorges Roger, "Photocatalytic, heterogeneous chemical reactor, is formed by microstructure in substrate with fluid inlet and outlet, sealing cover and photocatalytic surface", English translated Abstract of DE10209898, esp@cenet database, Sep. 25, 2003.

Deki S., et al., abstract of "Titanium (IV) oxide thin films prepared from aqueous solution", Chemistry Letters, 1996, p. 433, vol. 25.

* cited by examiner

METHOD AND SOLUTION FOR FORMING ANATASE TITANIUM DIOXIDE, AND TITANIUM DIOXIDE PARTICLES, COLLOIDAL DISPERSION AND FILM

FIELD OF THE INVENTION

The present invention relates generally to photo-catalytic titanium dioxide ($TiO_2$), and more particularly to methods and solutions for forming anatase $TiO_2$ and photo-catalytic $TiO_2$ particles, colloidal dispersion and films.

BACKGROUND $TiO_2$ films or coatings are useful in a number of applications. For example, a surface coated with a photo-catalytic $TiO_2$ film can be self-cleaning. When the surface is exposed to, for example, ultra-violet (UV) light, absorption of the light can induce oxidation-reduction reactions on the surface thus producing a cleaning effect. It is known that $TiO_2$ can be amorphous or in one of three possible crystalline phases, anatase, brookite and rutile. For self-cleaning purposes, anatase $TiO_2$ exhibits more stable photo-catalytic activity than the amorphous and the other two crystalline phases.

Amorphous $TiO_2$ can be converted to anatase $TiO_2$ at temperatures around 500° C. Thus, in many conventional techniques, anatase $TiO_2$ particles are formed by first forming amorphous $TiO_2$ particles and then sintering or calcining the amorphous $TiO_2$ particles (can be in a film) at a high temperature, such as at around 400 to 500° C., to obtain anatase $TiO_2$. A drawback of such techniques is the necessity to heat the particles or film to high temperatures. Heating to high temperatures may not be desirable, or even possible, in many applications. For example, when heated, thermal-mismatch can cause de-lamination of the coated $TiO_2$ film from the underlying substrate. It would be impossible to cure $TiO_2$ films on glass windows already installed on a building. Further, some substrates, such as textile or polymer substrates, may have low temperature resistance and thus it would be difficult to calcine $TiO_2$ films or powder coatings on them.

There are also known techniques for forming anatase $TiO_2$ films without sintering or calcination. For example, anatase $TiO_2$ can be formed by a gel-sol method described in Tadao Sugimoto et al., "Synthesis of uniform anatase $TiO_2$ nanoparticles by gel-sol method. 3. Formation process and size control", Journal of Colloid and Interface Science, (2003) vol. 259, pp. 43-52, the contents of which are incorporated herein by reference. In this approach, $TiO_2$ nanoparticles were prepared by aging a solution containing $Ti^{4+}$ ions and triethanolamine (TEOA). In a first aging stage, the solution was aged at 100° C. for 24 hours to form a $Ti(OH)_4$ gel. In a second aging stage, the gel was aged at 140° C. for 72 hours to nucleate and grow anatase $TiO_2$ particles. It is reported that almost all TEOA molecules were liberated from the Ti(IV) ions after the first aging stage. However, this approach has some problems. For example, when the formed $TiO_2$ nanoparticles are used to form photo-catalytic films, the photo-catalytic activities of the films are not very high. The films also tend to crack.

Accordingly, there is a need for an improved or alternative approach of forming anatase $TiO_2$. There is also a need for a photo-catalytic $TiO_2$ film with improved properties.

SUMMARY OF THE INVENTION

A sol solution comprising poly(titanic acid) and a planar heterocyclic ligand capable of forming a multi-coordinated Ti-complex can be provided. The sol solution can be aged to form $TiO_2$ particles having an anatase crystalline structure and multi-coordinated Ti-complexes including the heterocyclic ligand. The particles can be formed in a colloidal dispersion. A layer of the colloidal dispersion can be deposited on a support and dried to form a film. When the film is irradiated with UV light, the heterocyclic ligands in the complexes can decompose and be liberated due to photochemical reactions, thus forming a substantially anatase $TiO_2$ film. The sol solution may also include additional constituents such as a surfactant, an organic acid, and a base, for facilitating the aging process and improving the properties of the formed film.

Advantageously, the anatase $TiO_2$ particles, colloidal dispersion and films can be formed without sintering or calcination. The formed film can have improved properties, including high photo-catalytic activity and crack-resistance, as compared with $TiO_2$ films prepared by a conventional gel-sol method. The particles can have an average diameter less than about 20 nm. As a result, the film formed can be transparent.

Therefore, in an aspect of the present invention, there is provided a method of forming anatase titanium dioxide ($TiO_2$). The method comprises aging a sol solution comprising poly(titanic acid) and a planar heterocyclic ligand to form $TiO_2$ particles comprising a multi-coordinated Ti-complex. The multi-coordinated Ti-complex comprises the heterocyclic ligand. The sol solution may be aged at a temperature below about 140° C. such at about 120° C. for about 24 hours so that the $TiO_2$ particles are substantially in an anatase phase. The heterocyclic ligand can include at least one of triazole, tetrazole, and thiadiazole. The sol solution may be formed by aging a precursor solution at a temperature from 80 to 100° C. to form the sol solution, where the precursor solution includes the heterocyclic ligand and a precursor for the poly(titanic acid). The precursor for the poly(titanic acid) can include at least one of titanium alkoxide and titanium chloride. The precursor solution may also include one or more of an organic acid, a surfactant and a base. The $TiO_2$ particles may have an average particle size from 5 to 20 nm.

In another aspect of the present invention, there are provided titanium dioxide particles formed in accordance with the above paragraph.

In a further aspect of the present invention, there is provided a colloidal dispersion of titanium dioxide ($TiO_2$) particles. The $TiO_2$ particles comprise a multi-coordinated Ti-complex. The multi-coordinated Ti-complex comprises a planar heterocyclic ligand. The $TiO_2$ particles may have an anatase crystalline structure. The heterocyclic ligand may have less than 7 ring members. The heterocyclic ligand may comprise at least one of triazole, tetrazole, and thiadiazole. The colloidal dispersion may further comprise a surfactant. The surfactant may be selected from non-ionic and cationic surfactants. The surfactant may comprise a poly(ethylene oxide) oligomer moiety. The surfactant may also be selected from alkyl, alkylarylethoxylate, polyoxyethylene alkyl ethers, and alkylbenzene sulphonate surfactants. The $TiO_2$ particles may have an average particle size from 5 to 20 nm.

In a further aspect of the present invention, there is provided a method of forming a titanium dioxide ($TiO_2$) film, comprising depositing a layer of the $TiO_2$ particles described in one or both of the previous two paragraphs on a support. The depositing may comprise depositing a colloidal dispersion of the $TiO_2$ particles on the support and drying the colloidal dispersion to form the layer. The layer may have a thickness from 0.1 to 2 pm. The method may further comprise subjecting the layer to ultraviolet (UV) irradiation for a sufficient time to dissociate the heterocyclic ligand from the metallocene like multi-coordinated Ti-complex.

In a further aspect of the present invention, there is provided a film formed in accordance with the method of the previous paragraph.

In a further aspect of the present invention, there is provided a film including the titanium dioxide particles described in one or more of the previous five paragraphs.

In a further aspect of the present invention, there is provided a film comprising a titanium dioxide ($TiO_2$) matrix and a multi-coordinated Ti-complex, wherein the multi-coordinated Ti-complex comprises a planar heterocyclic ligand. The $TiO_2$ matrix may have an anatase crystalline structure. The heterocyclic ligand may have less than 7 ring members. The heterocyclic ligand may comprise at least one of triazole, tetrazole, and thiadiazole. The film may further comprise a surfactant. The surfactant may be selected from non-ionic and cationic surfactants. The surfactant may comprise a poly(ethylene oxide) oligomer moiety. The surfactant may also be selected from alkyl, alkylarylethoxylate, polyoxyethylene alkyl ethers, and alkylbenzene sulphonate surfactants. The film may be transparent.

In a further aspect of the present invention, there is provided a solution for forming a colloidal dispersion of anatase $TiO_2$ particles. The solution includes at least one of poly (titanic acid) and a precursor for poly(titanic acid), and a planar heterocyclic ligand capable of forming a multi-coordinated Ti-complex in a $TiO_2$ matrix. The heterocyclic ligand may have less than 7 ring members. The heterocyclic ligand may comprise at least one of triazole, tetrazole, and thiadiazole. The heterocyclic ligand may be 0.1 to 1 wt%, such as 0.4 to 0.8 wt%, of the solution. The solution may further comprise an organic acid. The organic acid may comprise at least one of an acetic acid, oxalic acid, lactic acid, citric acid, tartaric acid, succinic acid, $\alpha,\beta$-hydroxycarboxylic acid, $\alpha$, $\beta$-ketone,carboxylic acid, $\alpha,\beta$-amino,carboxylic acid, and $\alpha,\beta$-dihydroxy acid. The organic acid may be 1 to 5 wt% of the solution. The solution may further comprise a surfactant. The surfactant may be selected from non-ionic and cationic surfactants. The surfactant may comprise a poly(ethylene oxide) oligomer moiety. The surfactant may also be selected from alkyl, alkylarylethoxylate, polyoxyethylene alkyl ethers, and alkylbenzene sulphonate surfactants, in which case the surfactant may be 0.1 to 4 wt%, such as 1 to 2 wt%, of the solution. The solution may further comprise a base. The base may comprise an ethanolamine. The solution may have a pH value from 6 to 10. The solution may have a solvent selected from water and alcohol. The solution may comprise the precursor for poly(titanic acid), which may comprise at least one of titanium alkoxide and titanium chloride. The titanium alkoxide may comprise at least one of titanium isopropoxide, titanium butoxide, and titanium ethoxide. The titanium chloride may comprise titanium tetrachloride. The precursor may be 5 to 20 wt%, such as 10 to 12 wt%, of the solution. The solution may be a sol solution comprising the poly(titanic acid). The poly(titanic acid) may have the form $[Ti(OH)_4]_x$, wherein x is an integer from 1 to 10.

In a further aspect of the present invention, there is provided a method of preparing the sol solution described in the above paragraph. The method comprises aging a solution comprising a precursor for poly(titanic acid) and a planar heterocyclic ligand. The planar heterocyclic ligand is capable of forming like multi-coordinated Ti-complex in a $TiO_2$ matrix. The aging may comprise aging at a temperature from 80 to 100° C. The aging may comprise aging for at least about 24 hours.

Other aspect and features of the present invention will become apparent to Those of ordinary skill in the art upon review of the following description of specific embodiments of the invention in conjunction with the accompanying figures.

BRIEF DESCRIPTION OF THE DRAWINGS

In the figures, which illustrate exemplary embodiments of the invention.

DETAILED DESCRIPTION OF EXEMPLARY EMBODIMENTS

Figure 1:
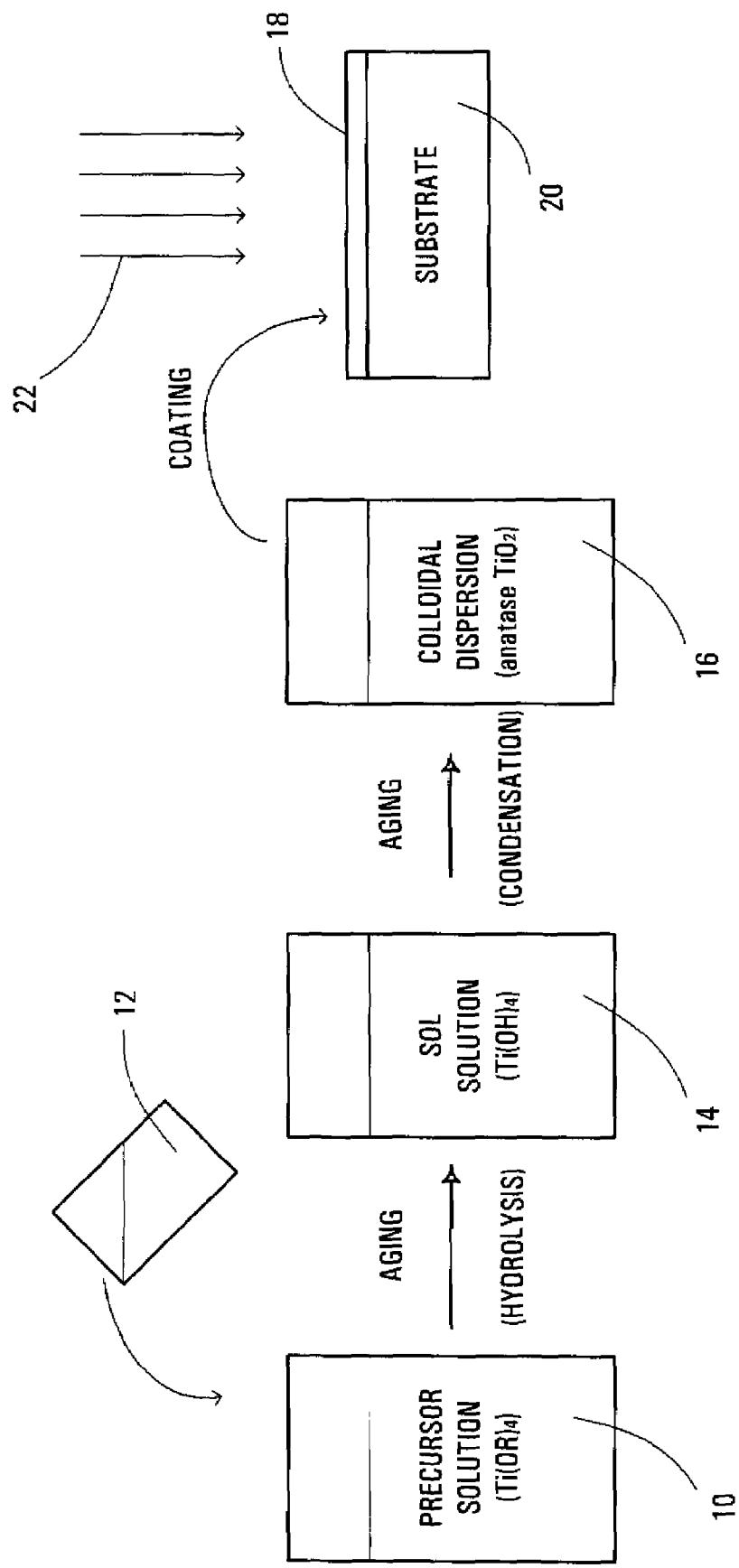
FIG. 1 is schematic diagram illustrating a process for forming a $TiO_2$ film.

FIG. 1 schematically illustrates a process for forming an anatase $TiO_2$ film, exemplary of embodiments the present invention.

A precursor solution 10 is provided. Precursor solution 10 contains a solvent, a precursor for poly(titanic acid), $[Ti(OH)_4]_x$, where x is an integer and a planar heterocyclic ligand capable of forming a multi-coordinated complex in a $TiO_2$ matrix. It can be advantageous if precursor solution 10 also contain other additives such as an organic acid, a base, and a surfactant.

As depicted, the precursor for poly(titanic acid) can include molecular species in the form of $Ti(OR)_4$, where R is a suitable substituent for H. The precursor can be formed by adding a suitable Ti-containing substance 12 to the solvent, which, when dissolved or dispersed in the solution, can be hydrolysed to generate titanic acid $Ti(OH)_4$ and poly(titanic acid) $[Ti(OH)_4]_x$. For example, Ti-containing substance 12 can include a titanium alkoxide or a titanium chloride, such as titanium isopropoxide $Ti(i-OPr)_4$, titanium butoxide $Ti(n-OBu)_4$, titanium ethoxide, titanium tetrachloride ($TiCl_4$), or the like. The concentration of Ti-containing substance 12 in solution 10 can vary depending on the particular substance used and the application. For example, the concentration can be in the range from 5 to 20 wt % ("wt %" means "percent by weight" herein). In some applications, 10 to 12 wt % may be advantageous.

The heterocyclic ligand can be any suitable planar heterocyclic molecule that is water-soluble. A heterocyclic ligand is a closed-ring organic structure containing atoms from groups 5A and 6A, such as nitrogen or sulphur. For use in the present process, a planar ring having 5 or 6 ring members can be advantageous because of its chemical stability. For a heterocyclic molecule to be planar, the ring typically includes two or three double bonds that are separated by only one single bond, thus forming a structure known as the conjugated structure. As is known, ligands that can form metallocene structures with transition metals (in groups 4 and 5) include substituted cyclo-pentadienes and 1 ,3-clco-hexadiene. For a discussion of the formation of multi-coordinated complexes with 5- or 6-member heterocyclic compounds as the ligands see, for example, L. A. Burke et al., Journal of the Chemical Society- Perkin Transactions, (2001), vol. 2, pp. 1679-1684, the contents of which are incorporated herein by reference. While a lone multi-coordinated complex formed with a 5- or 6- member heterocyclic ligand may lack suitable chemical stability, when such a heterocyclic ligand is inserted in the bulk of poly(titanic acid) or $TiO_2$ matrix, a stable multi-coordinated structure can be formed due to coordination of the heterocyclic ligand to more than one Ti(IV) ion through double bonds of the ring. Such multi-coordination stabilizes the multi-coordinated structure. Heterocyclic compounds that have planar structures include imidazole, triazine, thiadiazole, pyrimidine and pyrazine.

Figure 2:
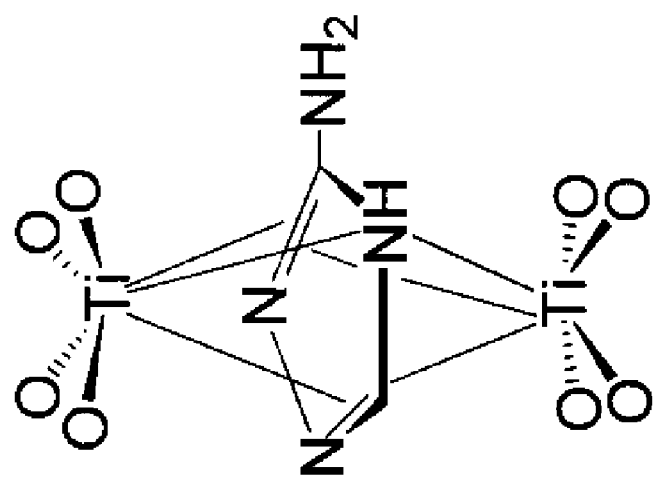
FIG. 2 is a schematic diagram illustrating the formation of a Ti-complex.
Figure 2:
Figure 2:
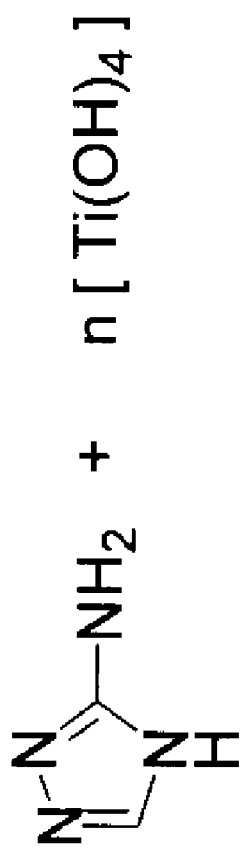

It can be advantageous if the heterocyclic ligands are hydrophilic. The heterocyclic ligands may include hydrophilic substitute groups such as —OH, —$NH_2$, —$SO_3H$, and -COCH. As can be appreciated, the heterocyclic ligands should be soluble in the solvent. The number of ring members of the heterocyclic ligands may vary but is generally less than 7. Suitable heterocyclic ligands include triazoles, tetrazoles, thiadiazoles, and the like. For example, suitable heterocyclic ligands include pyrazine, pyrimidine, pyridine, triazine, imidazole, and the like. As can be appreciated, planar heterocyclic ligands may interact with $[Ti(OH)_4]_x$ to form multi-coordinated Ti-complexes, as illustrated in FIG. 2. As depicted, a heterocyclic ligand such as an azole ring can bridge two Ti(IV) in a $TiO_2$ matrix formed from multiple $Ti(OH)_4$ species. The rings can form coordination complexes with $TiO_2$ through Ti-NH coordination bonds and Ti-π coordination bonds, the latter through the double bonds (in either N=N or C=N) of the ring. As can be appreciated by a person skilled in the art, the coordination complexes are multi-coordinated Ti-complexes. The planar structure of the ring allows the ring to be intercalated into the $TiO_2$ bulk because the coordination bonds can form on both sides of the ring. The benefits of the formation of the multi-coordinated complexes will become clear below. The concentration of the heterocyclic ligand in precursor solution 10 can vary. Typically, it can be 0.1 to 1 wt%. In some applications, 0.4 to 0.8 wt% may be advantageous.

The solvent can be water or alcohol based. For example, the solvent can include ethanol, 2-propanol, 1-propanol, 1-butanol or distilled water. The solvent is suitable for carrying out sol-gel reactions therein. The solvent may also be suitable as a liquid medium for dispersing $TiO_2$ colloidal particles, as will be further described below. It may be desirable that the solvent is hydrophilic, of low or no toxicity, and of medium volatility. Hence, low-molecular-weight alcohols may be particularly appropriate in many applications. As will be understood, in pure water the hydrolysis rate of the precursor to $Ti(OH)_4$ can be very fast, which may not be desirable. Thus, when water is used as the solvent, it may be necessary to include in the solution sufficient organic ligands to reduce the hydrolysis rate.

The organic acid in precursor solution 10 may be any suitable acid for catalysing sol-gel reactions, such as hydrolysis and condensation reactions. Addition of the acid can also affect the pH of precursor solution 10. Organic acids may be advantageous since they can improve colloidal stability. As can be appreciated, the acid can serve as peptizing agents for facilitating formation of colloids of Ti-complexes such as $Ti(OH)_4$, $TiO_2$, and the like. For example, the acid can be an acetic acid, oxalic acid, lactic acid citric acid, succinic acid, tartaric acid, or the like. The acid can also include stable chelating rings, and can be an α,β-hydroxycarboxylic acid; α,β-ketone, carboxylic acid; α,β-amino,carboxylic acid; α,β-dihydroxy, or the like. A mixture of two or more of the above acids may be used. The acid may be 1 to 5 wt % of precursor solution 10.

The base can be any suitable base substance. An organic base may be advantageous. For example, the base can be an ethanolamine (including mono-, di-, or tri-substituted ethanolamine). The base can be used to adjust pH value of precursor solution 10. As will be discussed further below, the pH value of precursor solution 10 can affect the properties of the resulting $TiO_2$ particles or film. The pH value of precursor solution 10 may be initially from about 1 to about 2 and be adjusted to up to about 10. The base can also, in combination with the acid, enhance colloidal stability during aging. The base may be bi-functional and contain both —$NH_2$ and —OH groups. The choice of the base and the amount added can be determined by a person skilled in the art based on the desired pH as well as other considerations. It has been found that 0.1-10 wt % of the base in the solution may be suitable. In some applications, 1 to 3 wt % may be advantageous.

A surfactant can reduce surface and interfacial tension in the solution and can be used to control the condensation process of the Ti-complexes in the solution and the growth of nano-sized $TiO_2$ particles. A surfactant may also be used to prevent cracking in a resulting $TiO_2$ film. It may be advantageous to use a non-ionic or cationic surfactant. As can be understood, non-ionic and cationic surfactants contain hydrophilic moieties of the Lewis base type. The Ti(IV) sites on particles of sol or crystalline $TiO_2$ are Lewis acids so that the surfactant molecules can facilitate particle growth and film formation via adsorption on the $TiO_2$ particles. Suitable surfactants include surfactants that have poly(ethylene oxide) oligomer (PEG) moieties. Example surfactants include alkyl, alkylarylethoxylate, polyoxyethylene alkyl ethers, alkylbenzene sulphonate surfactants, and the like. For example, commercially available surfactants such as Brij-30™ or Triton-X100™ may be suitable non-ionic surfactants. A mixture of different surfactants may also be added. Typically, precursor solution 10 may contain 0.1 to 4 wt % of the surfactant. In some applications, it may be advantageous to limit the content of the surfactant to 1 to 2 wt %.

As can be understood, it may be necessary to continuously stir or otherwise agitate the solution after adding Ti-containing substance 12 to precursor solution 10 and during aging. As can be appreciated, during $TiO_2$ particle formation stirring can promote mass transfer between the reaction medium and the $TiO_2$ nuclei. Without stirring, the nuclei may be surrounded by organic ligands, thus hindering the gelation process. During the subsequent thermal aging, agitation can also prevent irreversible agglomeration of $TiO_2$ colloidal particles.

Precursor solution 10 can be aged to form $TiO_2$ particles having anatase crystal structures.

The term "age" when used as a verb herein refers to subjecting a substance to controlled conditions to allow relatively slow change in properties or structures of the substance over a period of time. As can be understood, during particle formation, slow hydrolysis and condensation can prevent premature precipitation due to formation of large particles. During crystallization, slow change can reduce defects in the final crystalline structure. The controlled conditions can include temperature, pressure, pH, and other environmental factors. Generally, aging may be carried out at room temperature or by subjecting the substance to a heat treatment, such as in a pressure-resistant container. As can be understood by persons skilled in the art, the growth of crystalline structures is a relatively slow process. If the species in a solution precipitate very fast, the precipitated particles are more likely in an amorphous state instead of a crystalline state.

As depicted, precursor solution 10 may be aged at temperatures below about 140° C. to form a sol solution 14. Precursor solution 10 may be aged at a temperature from 80 to 100° C. for about 24 hours to allow sol-gel reactions such as hydrolysis to occur. As can be understood, $[Ti(OH)_4]_x$ complexes can be formed through hydrolysis processes. Sol solution 14 contains a colloidal suspension of many species including Ti-complexes such as $[Ti(OH)_4]_x$, where x is a small integer such as from 1 to 10. This process is known as peptization.

As can be understood by a person skilled in the art, in a different embodiment of the present invention, sol solution 14 may be prepared in another suitable manner different from described above. For example, the $[Ti(OH)_4]_x$ species may be formed through a different chemical route known to persons skilled in the art. The heterocyclic ligands may be omitted in the precursor solution but are added after the $[Ti(OH)_4]_x$ species have been formed through hydrolysis and are brought into the $TiO_2$ matrix during the aging step.

Sol solution 14 can be readily treated to form anatase $TiO_2$ particles suitable for forming photo-catalytic films.

In an exemplary embodiment, sol solution 14 is further aged at a temperature between 100° C. and 140° C., such as about 120° C., for about 24 hours, to allow gelation or condensation of Ti-complexes to form $TiO_2$ particles in a colloidal dispersion 16 and transformation of the $TiO_2$ molecules in the amorphous phase to the anatase phase. In an alternative embodiment, this second aging can be at least partially carried out after a film has been formed from the sol solution or a partially aged colloidal dispersion. The total aging time may vary in different embodiments but should be long enough to allow growth of the anatase crystalline structures. As evidenced by experimental data, some of which will be described below, and conveniently, after about 24 hours of aging, the resulting $TiO_2$ particles are substantially in the anatase phase. During aging, some heterocyclic ligands remain in the $TiO_2$ particles, forming multi-coordinated complexes as illustrated in FIG. 2.

Without being limited to any particular theory, the formation of anatase $TiO_2$ is likely facilitated by the presence of heterocyclic ligands because the formation of multi-coordinated complexes can lower the energy barrier for transforming $TiO_2$ from the amorphous phase to the anatase phase. As can be appreciated by a person skilled in the art, the heterocyclic ligands are Lewis bases and can donate electrons. While some other ligands such as triethanolamine (TEGA) are also Lewis bases, they are not as effective as heterocyclic ligands because they are labile and could not remain in the $TiO_2$ particles by forming multi-coordinated complexes with $TiO_2$ molecules. The presence of the heterocyclic ligands may thus increase the maximum anatase content obtainable at low temperatures.

Without being limited to any particular theory, the formation of anatase $TiO_2$ is likely facilitated by the presence of heterocyclic ligands because the formation of metallocene-like complexes can lower the energy barrier for transforming $TiO_2$ from the amorphous phase to the anatase phase. As can be appreciated by a person skilled in the art, the heterocyclic ligands are Lewis bases and can donate electrons. While some other ligands such as triethanolamine (TEOA) are also Lewis bases, they are not as effective as heterocyclic ligands because they are labile and could not remain in the $TiO_2$ particles by forming metallocene-like complexes with $TiO_2$ molecules. The presence of the heterocyclic ligands may thus increase the maximum anatase content obtainable at low temperatures.

Advantageously, the sizes of $TiO_2$ particles in colloidal dispersion 16 can be on the nano-scale. The average particle size or diameter can be controlled to be from 5 to 20 nm. Particles having sizes smaller than about 20 nm may be advantageous because they can be used to form transparent films. The sizes of the particles can be controlled by adjusting the pH value of solutions 10 and 14 during aging and by adjusting the concentrations of various additives. As can be understood, the resulting particle sizes and structure of the $TiO_2$ particles can be affected by a number of factors, including aging condition such as temperature and pH and the chemical species present in the sol solution such as the organic acid.

For example, experimental data showed that when TEOA was used as both the base and the coordination ligand (that is, there were no heterocyclic or acid ligands in the solution) and the solution was aged at below 100° C., the aged $TiO_2$ particles exhibited low crystallinity, apparently because large portions inside the particles were in the amorphous phase. Raising the aging temperature to above 140° C. caused over-condensation and growth of large-sized $TiO_2$ particles, which precipitated out of the colloidal suspension.

Experimental data also showed that rutile phase was present when the pH of the solution was from about 1 to about 6. When the solution had a pH of about 1, the average particle size was about 4 nm and the ratio of detected intensities for anatase and rutile phases was about 1:1. When pH was increased to about 7, the average particle size increased to about 15 nm and the $TiO_2$ particles were substantially in the anatase phase. However, when pH was further increased to 11, negligible condensation of $[Ti(OH)_4]_x$ complexes occurred, and hence few $TiO_2$ particles were formed. Thus, it may be desirable that the pH value of precursor solution 10 or sol solution 14 is from 6 to 10.

A layer 18 of the $TiO_2$ particles from colloidal dispersion 16 can be deposited on a support such as substrate 20. It may be advantageous if substrate 20 has a substantially planar surface. The layer may have any suitable thickness, coating area, viscosity and $TiO_2$ content, depending on the application. The solid $TiO_2$ content in the initial layer may be in the range of 1 to 3 wt %. Layer 18 may be dried such as at room temperature for about 3 to 12 hours depending on its thickness. The drying period may last for a sufficient period of time to allow inter-particle binding in layer 18. Layer 18 can be of any suitable thickness. A thinner layer is easier to dry. Multiple layers may be consecutively formed to form a thick film, yet still allow each layer to dry properly. The resulting film may have a thickness from 0.1 to 2 μm, or another desirable thickness.

The film can be made transparent or translucent. As can be appreciated, the transparency of the film can vary depending on the sizes of the particles used to form the film. Advantageously, when the $TiO_2$ particles have an average diameter or particle size below about 20 nm, the film can be transparent.

The support or substrate 20 can be made of any suitable material for coating $TiO_2$. For example, glasses such as quartz glass, metals such as aluminium and stainless steel, ceramics, plastics, other polymer sheets, and the like may be used. The support should, however, be chemically stable in the presence of $TiO_2$ and visible or UV-irradiation. The support can also be any desirable object on which a photo-catalytic coating is to be formed.

Layer 18 can be deposited on substrate 20 using any suitable technique, such as spin coating. Persons skilled in the art can readily determine a suitable coating technique for a given application. Layer 18 may be coated on a surface for self-cleaning by a user.

Once dried, layer 18 can be subject to visible or UV irradiation such as UV light 22. Under UV light 22, photochemical reactions occur in layer 18 and, as a result, some of the heterocyclic ligands in the Ti-complexes are liberated from the complexes, that is, they are no longer coordinated with the Ti(IV) ions in the complexes. The heterocyclic ligands may also decompose, leaving a small number of, for example, nitrogen atoms in the $TiO_2$ lattice or matrix. The nitrogen atoms bind to the Ti atoms through Ti—N bond and can enhance the photo-catalytic activity of the $TiO_2$ film. Other ligands such as acid or base ligands may also be liberated after UV irradiation through photo-catalytic decomposition reactions. As a result, these ligands are degraded to smaller molecular fragments which are volatile or water-soluble and therefore could be removed from the $TiO_2$ coating. Consequently, a photo-catalytic and substantially anatase $TiO_2$ film 18 is formed.

Figure 3:
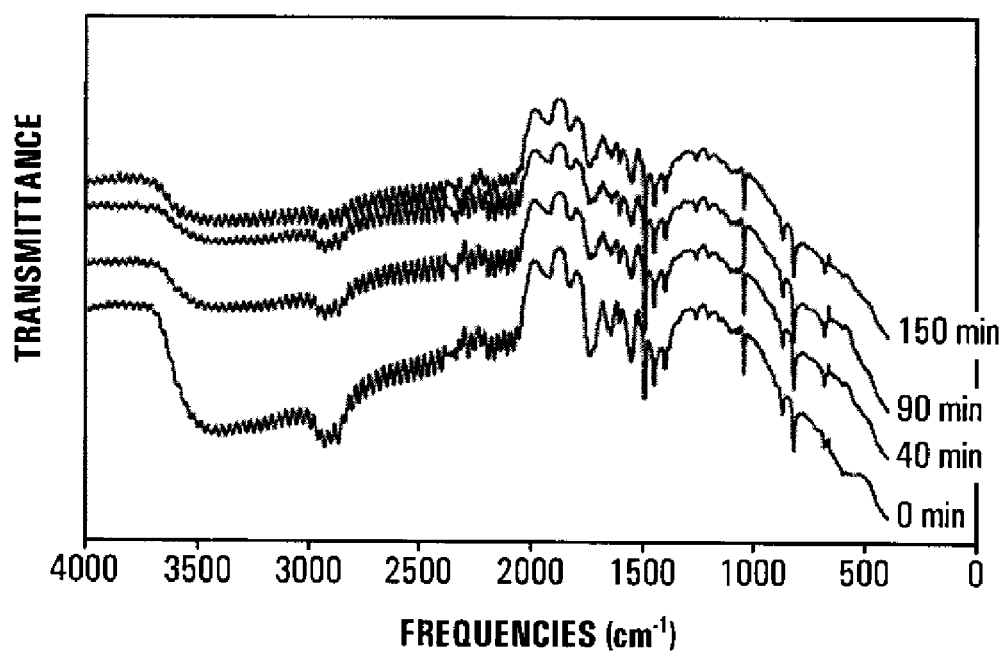
FIG. 3 is a line graph showing Fourier-Transform Infrared (FTIR) spectra of a $TiO_2$ film.

The liberation of heterocyclic ligands, and other organic ligands, from the film can be detected, for example, by measuring absorption responses using a Fourier-transform infrared (FT-IR) spectroscopy technique. As can be understood, the characteristic absorption frequency is at around 2900 $cm^{-1}$ for C—H stretching vibration and at around 1700 $cm^{-1}$ for the C=O bond. Weak signals at these frequencies can indicate a weak bond or that a bond has been broken. The binding of hydroxyl groups can be indicated by signals at about 3400 $cm^{-1}$ and 1650 $cm^{-1}$. The IR spectroscopy can thus be used to detect the extent of pre-activation, or liberation of the ligands. When the characteristic IR absorption peaks of the organic species disappear, the pre-activation is completed. Example FT-IR spectra measured before and after UV-irradiation are shown in FIG. 3 where the time for each line indicates the period of time the sample has been subject to irradiation.

The resulting film 18 can be highly photo-catalytic and can have good physical and mechanical properties. For example, a film formed as described herein can exhibit photo-catalytic activities 1.5 to 2 times higher than a film formed from a solution without the heterocyclic ligands.

In addition to the positive influence on the photo-catalytic activity, the presence of the heterocyclic ligands in the $TiO_2$ particles can also improve the mechanical properties of film 18, such as texture cohesion, structure uniformity, adhesion, and crack-resistance. Without being limited to any particular theory, it is expected that the presence of the heterocyclic ligands can buffer material stress generated during coating. The buffering effect can be attributed to yielding of $TiO_2$ particles to the stress, facilitated by the multi-coordinated complexes. As a consequence, micro-cracks in the final film and delamination of the film can be reduced.

The crack-resistance of the film can also be increased by addition of a surfactant such as PEG surfactants.

Advantageously, anatase $TiO_2$ particles and films can be formed without calcination. They can be formed quicker and can have higher photo-catalytic activities, as compared to conventional techniques. The organic species in the film, including the heterocyclic ligands, organic acid ligands, and surfactants, can be easily removed from the film surface once the film is irradiated with UV light due to their high photochemical activity.

As can be appreciated, the processes described above do not have to be performed at once. Different steps can also be performed by different users at different locations. For example, each of the precursor and sol solutions and the colloidal dispersion may be prepared and stored in suitable conditions for later use. The anatase $TiO_2$ particles can be formed and stored such as in a dark container. The stored particles can be later used to form photo-catalytic films or for other purposes.

The embodiments of the present invention can have applications in a wide range of fields, such as for coating various surfaces including dirt-free and sterile coatings on exterior and interior walls or glass windows of buildings and vehicles, for preparing sterilized textile products or toolsets, for modifying surfaces of ceramic membranes for air or water filtration, and the like.

Other features, benefits and advantages of the present invention not expressly mentioned above can be understood from this description and the drawings by those skilled in the art.

Exemplary embodiments of present invention are further illustrated by the following, non-limiting examples.

EXAMPLE 1

In this example, a number of samples were prepared. The solutions for preparing these samples were water based. The solution for each sample was prepared as follows:

1. 0.1 g 5-aminotetrazole monohydrate was added into 24-ml distilled water.
2. 0.78 g oxalic acid dehydrate and 1.0 ml Triton X-100 were added.
3. Appropriate amount of TEOA was added to adjust the pH of the solution.
4. 3.5 ml titanium (IV) isopropoxide was added drop-wise through a funnel.

The final pH of the solution was higher than about 5 but varied for different samples.

The solution was stirred and aged at about 80° C. for about 24 hours until a stable, homogenous and transparent sol solution was formed. The sol solution was sealed in a Teflon™-lined autoclave and aged at about 120° C. for about 24 hours to nucleate and grow anatase phase $TiO_2$ particles. The colloidal dispersion of $TiO_2$ particles was spin-coated on a Si(100) substrate or a glass plate.

Figure 4:
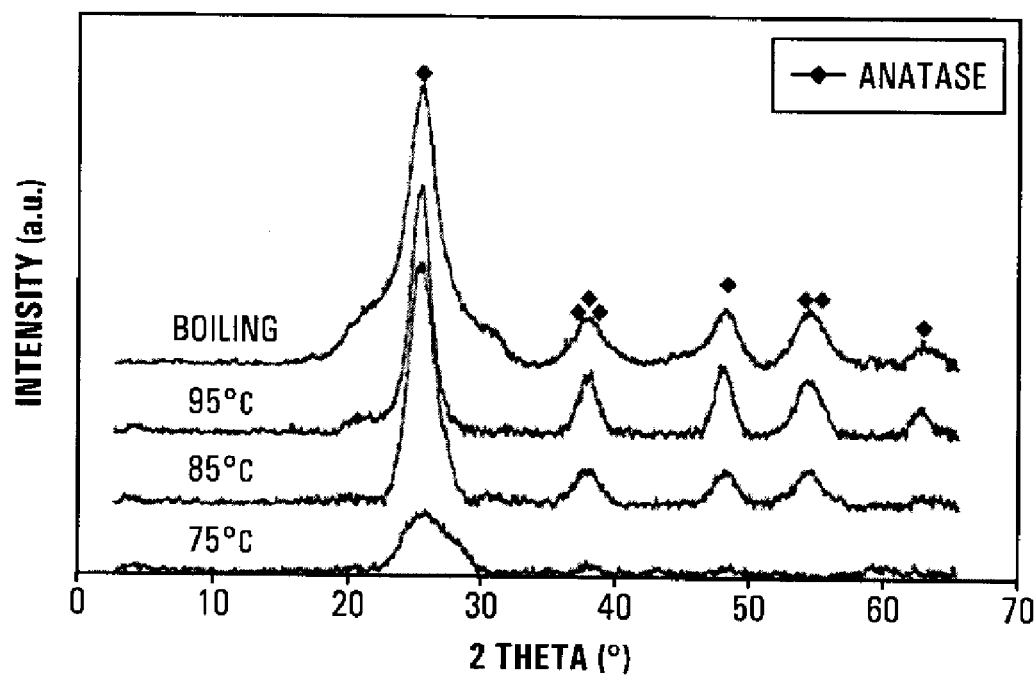
FIG. 4 is a line graph showing X-ray diffraction (XRD) patterns of a $TiO_2$ film.

FIG. 4 shows the X-ray diffraction (XRD) intensities measured from films coated on Si(100) substrates. The films were formed from colloidal dispersions prepared as described above with a solution having a pH of about 6, but being aged at different temperatures. The temperature value above each line in FIG. 4 indicates the aging temperature for the line. As can be seen, when only aged at a low temperature (bottom line), there was little crystal formation (in either anatase or rutile phase) and the film contained mainly amorphous $TiO_2$ particles. After aging at about 100° C. (top line), a high peak appears at $2\theta=25.8$ (101), which is the characteristic peak of the anatase phase.

The average particle sizes of $TiO_2$ particles formed in solutions of different pH values were assessed using a transmission electron microscope (TEM).

Figure 5:
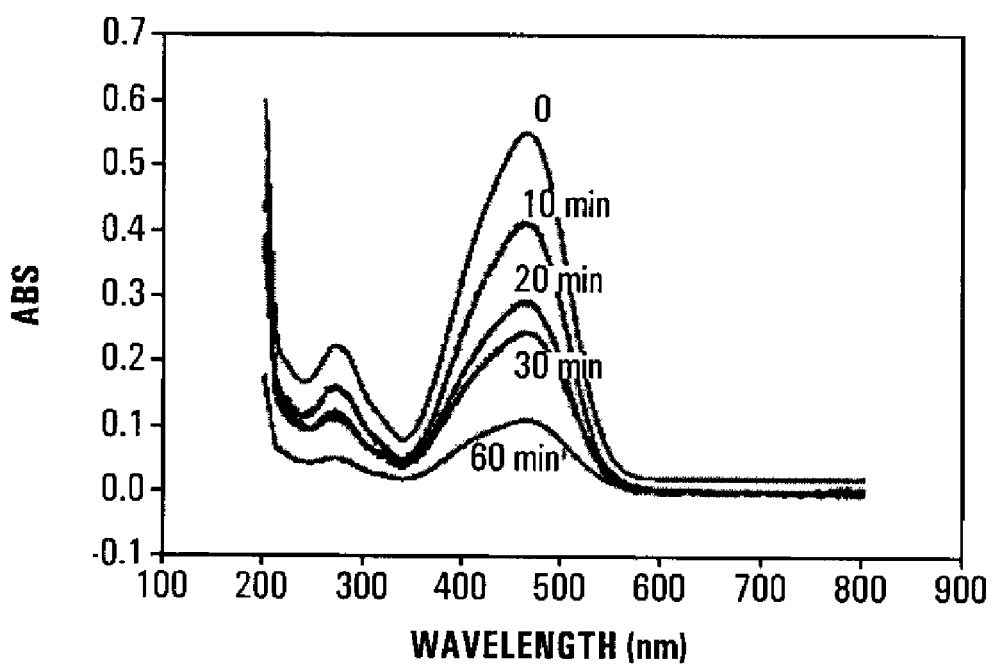
FIG. 5 is a line graph showing UV-VIS absorption of methyl orange.

The photo-catalytic activity of a sample $TiO_2$ film formed on a glass plate was evaluated by inserting the plate into a quartz cell (10 mm×10 mm×45 mm) holding a methyl orange aqueous solution (0.05 mM, 3 mL) at neutral pH and ambient temperature. The film was irradiated in a Rayonet™ photochemical reactor equipped with 10 UV photochemical lamps (each with 30 W and maximum output at wavelength of 300 nm). The concentration of methyl orange was monitored during irradiation using a UV-Visible spectroscopy (on a Shimadzu™ instrument). An exemplary result is shown in FIG. 5. As can be seen, the absorption intensity decreased with time of irradiation. About 90% of the methyl orange was decomposed in about one hour of UV irradiation for the doped film.

Figure 6:
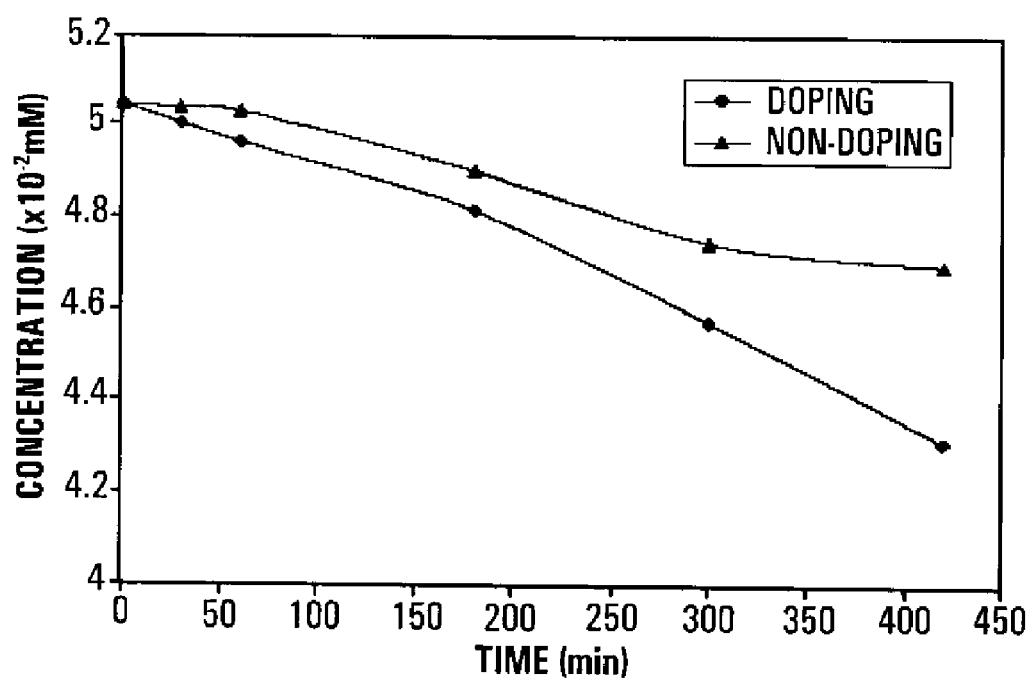
FIG. 6 is a line graph showing concentrations of methyl orange as a function of time.

For comparison, measurements were also made with a reference sample, which was a glass plate coated with a $TiO_2$ film similarly prepared but not doped with heterocyclic ligands. Some results are shown in FIG. 6, which shows that less methyl orange was decomposed for the un-doped film. As can be seen, the doped film has a higher photo-catalytic activity than the un-doped film by a ratio of about 1.5.

Figure 7:
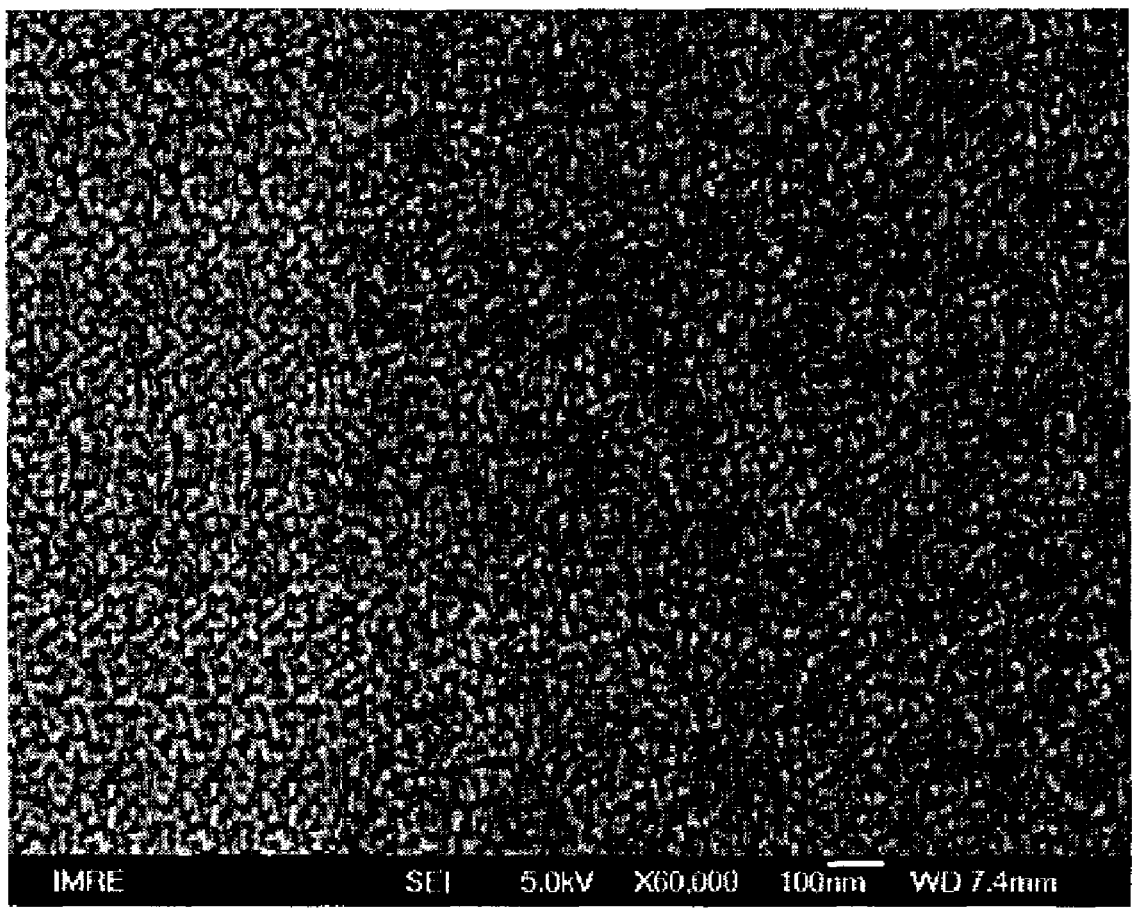
FIG. 7 is a scanning electron microscopic (SEM) image of a sample $TiO_2$ film.

FIG. 7 is a magnified image of a sample film formed as described in this Example on a glass plate. The image was taken after the sample film had been exposed to UV-irradiation for about 24 hours. As can be seen, the image shows no sign of micro-cracking in the sample film.

EXAMPLE 2

In this example, the solution was alcohol based and was prepared as follows:
1. 0.1 g of 2-amino-5-mercapto-1,3,4-thiadiazole was added to a 24-ml iso-butanol solution.
2. 1.1 ml of lactic acid and 0.8 ml of Triton X-100 were added.
3. 4.5 ml of Titanium (IV) n-butoxide was added drop-wise through a funnel.

The solution was stirred at 80° C. for 24 hours to form a yellow-orange coloured sol solution. The sol solution was sealed in a Teflon-lined autoclave and treated at 120° C. for 24 hours to form $TiO_2$ nano-particles.

Sample $TiO_2$ films were formed from the $TiO_2$ nanoparticles. Test results show that the films were substantially formed of anatase $TiO_2$. The sample films also exhibited similar photo-catalytic activity as in Example 1.

Experimental data also showed that films formed with $TiO_2$ particles having a heterocyclic ligand and a PEG surfactant therein have improved crack-resistance and adhesion, as compared to films formed with pure $TiO_2$.

Of course, the above described embodiments are intended to be illustrative only and in no way limiting. The described embodiments are susceptible to many modifications of form, details and order of operation. The invention, rather, is intended to encompass all such modification within its scope, as defined by the claims.

What is claimed is:

1. A method of forming anatase titanium dioxide ($TiO_2$), comprising:
   aging a sol solution comprising poly(titanic acid) and a planar heterocyclic ligand to form $TiO_2$ particles comprising a Ti-complex, said Ti-complex being a coordination complex formed from said heterocyclic ligand and $TiO_2$ through at least a Ti-π coordination bond, said heterocyclic ligand comprising at least one of triazole. tetrazole, and thiadiazole.

2. The method of claim 1, wherein said aging a sol solution comprises aging said sol solution at a temperature below about 140° C.

3. The method of claim 2, wherein said temperature is about 120° C.

4. The method of claim 2, wherein said sol solution is aged for at least about 24 hours at said temperature, whereby said $TiO_2$ particles are substantially in an anatase phase.

5. The method of claim 1, wherein said heterocyclic ligand has less than 7 ring members.

6. The method of claim 1, further comprising aging a precursor solution at a temperature from 80 to 100° C. to form said sol solution, said precursor solution comprising said heterocyclic ligand and a precursor for said poly(titanic acid).

7. The method of claim 6, wherein said precursor solution is aged for at least about 24 hours at said temperature from 80 to 100° C.

8. The method of claim 6, wherein said precursor for said poly(titanic acid) comprises at least one of titanium alkoxide and titanium chloride.

9. The method of claim 8, wherein said titanium alkoxide comprises at least one of titanium isopropoxide, titanium butoxide, and titanium ethoxide.

10. The method of claim 8, wherein said titanium chloride comprises titanium tetrachloride.

11. The method of claim 6, wherein said precursor is 5 to 20 wt% of said precursor solution.

12. The method of claim 11, wherein said precursor is 10 to 12 wt% of said precursor solution.

13. The method of claim 7, wherein said heterocyclic ligand is 0.1 to 1 wt% of said precursor solution.

14. The method of claim 13, wherein said heterocyclic ligand is 0.4 to 0.8 wt% of said precursor solution.

15. The method of claim 6, wherein said precursor solution further comprises an organic acid.

16. The method of claim 15, wherein said organic acid comprises at least one of an acetic acid, oxalic acid, lactic acid, citric acid, tartaric acid, succinic acid, α,β-hydroxycarboxylic acid, α,β-ketone, carboxylic acid, α,β- amino, carboxylic acid, and α,β-dihydroxy acid.

17. The method of claim 15, wherein said organic acid is 1 to 5 wt% of said precursor solution.

18. The method of claim 6, wherein said precursor solution further comprises a surfactant.

19. The method of claim 18, wherein said surfactant is selected from non-ionic and cationic surfactants.

20. The method of claim 18, wherein said surfactant comprises a poly(ethylene oxide) oligomer moiety.

21. The method of claim 18, wherein said surfactant is selected from alkyl, alkylarylethoxylate, polyoxyethylene alkyl ethers, and alkylbenzene sulphonate surfactants.

22. The method of claim 18, wherein said surfactant is 0.1 to 4 wt% of said precursor solution.

23. The method of claim 22, wherein said surfactant is 1 to 2 wt% of said precursor solution.

24. The method of claim 6, wherein said precursor solution further comprises a base.

25. The method of claim 24, wherein said base comprises an ethanolamine.

26. The method of claim 6, wherein said precursor solution has a pH value from 6 to 10.

27. The method of claim 6, wherein said sol solution has a solvent selected from water and alcohol.

28. The method of claim 1, wherein said $TiO_2$ particles have an average particle size from 5 to 20 nm.

29. Titanium dioxide ($TiO_2$) particles formed in accordance with claim 1, comprising said Ti-complex..

30. A colloidal dispersion of titanium dioxide ($TiO_2$) particles, said $TiO_2$ particles comprising a Ti-complex, said Ti-complex being a coordination complex formed from a planar heterocyclic ligand and $TiO_2$ through at least a Ti-π coordination bond, said heterocyclic ligand comprising at least one of triazole, tetrazole, and thiadiazole.

31. A method of forming a titanium dioxide ($TiO_2$) film, comprising depositing a layer of the $TiO_2$ particles of claim 29 on a support.

32. A film formed in accordance with the method of claim 31.

33. A film comprising the titanium dioxide particles of claim 29.

34. A film comprising a titanium dioxide ($TiO_2$) matrix and a Ti-complex, said Ti-complex being a coordination complex formed from a planar heterocyclic ligand and $TiO_2$ through at least a Ti-$\pi$ coordination bond, said heterocyclic ligand comprising at least one of triazole, tetrazole, and thiadiazole.

35. A solution for forming a colloidal dispersion of anatase $TiO_2$ particles, comprising:
   at least one of poly(titanic acid) and a precursor for poly(titanic acid); and
   a planar heterocyclic ligand capable of forming a Ti-complex in a $TiO_2$ matrix, said Ti-complex being a coordination complex formed from said heterocyclic ligand and $TiO_2$ through at least a Ti-$\pi$ coordination bond, said heterocyclic ligand comprising at least one of triazole, tetrazole, and thiadiazole.

36. A method of preparing the solution of claim 35, wherein said solution is a sol solution comprising said poly(titanic acid), said method comprising aging a solution comprising said precursor for poly(titanic acid) and said planar heterocyclic ligand.

37. A method of forming anatase titanium dioxide ($TiO_2$), comprising:
   aging a sol solution comprising poly(titanic acid) and a planar heterocyclic ligand to form $TiO_2$ particles comprising a Ti-complex, said Ti-complex being a coordination complex formed from said heterocyclic ligand and $TiO_2$ through at least a Ti-$\pi$ coordination bond.

38. The method of claim 37, wherein said planar heterocyclic ligand comprises an azole.

39. The method of claim 37, wherein said planar heterocyclic ligand comprises at least one of imidazole, triazine, thiadiazole, pyrimidine, and pyrazine.

40. Titanium dioxide ($TiO_2$) particles formed in accordance with claim 37, comprising said Ti-complex.

* * * * *